US 12,493,885 B2

(12) United States Patent
Singh et al.

(10) Patent No.: US 12,493,885 B2
(45) Date of Patent: Dec. 9, 2025

(54) LEVERAGING SPATIAL COMPUTING LIDAR FEEDBACK TO DYNAMICALLY GENERATE IDENTITY PROFILES

(71) Applicant: Bank of America Corporation, Charlotte, NC (US)

(72) Inventors: Shailendra Singh, Maharashtra (IN); Debarati Aich, West Bengal (IN); Nimish Ravindra Deshpande, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/407,819

(22) Filed: Jan. 9, 2024

(65) Prior Publication Data

US 2025/0225522 A1 Jul. 10, 2025

(51) Int. Cl.
*G06Q 40/00* (2023.01)
*G06Q 20/40* (2012.01)
*G06T 7/00* (2017.01)

(52) U.S. Cl.
CPC ....... *G06Q 20/4016* (2013.01); *G06T 7/0002* (2013.01); *G06T 2207/10028* (2013.01); *G06T 2207/20081* (2013.01)

(58) Field of Classification Search
CPC .............. G06Q 20/4016; G06T 7/0002; G06T 2207/10028; G06T 2207/20081
See application file for complete search history.

(56) References Cited

U.S. PATENT DOCUMENTS

| | | | |
|---|---|---|---|
| 10,083,285 B2 | 9/2018 | Asghari-Kamrani et al. |
| 10,424,145 B2 | 9/2019 | Rogers et al. |
| 10,692,164 B2 | 6/2020 | Dill |
| 10,771,251 B1 | 9/2020 | Kurani et al. |
| 10,819,694 B2 | 10/2020 | Moran et al. |

(Continued)

FOREIGN PATENT DOCUMENTS

JP 7351591 B2 9/2023

OTHER PUBLICATIONS

Leveraging Deep Convolutional Neural Networks Pre-Trained on Autonomous Driving Data for Vehicle Detection From Roadside LiDAR Data; (vol. 23, Issue: 11, 2022, pp. 22367-22377); Shanglian Zhou, Hao Xu, Guohui Zhang, Tianwei Ma, Yin Yang; Jun. 24, 2022. (Year: 2022).*

*Primary Examiner* — Tien C Nguyen
(74) *Attorney, Agent, or Firm* — Banner & Witcoff, Ltd.

(57) ABSTRACT

Arrangements for leveraging LiDAR for user validation are provided. A computing platform may receive, from a spatial computing device, first data of a first user environment at a first time captured via LiDAR. A first spatial computing map of the first user environment at the first time may be generated and scored to indicate a likelihood that a user of the spatial computing device is valid. The computing platform may receive a request to process an event. In response, the computing platform may cause the spatial computing device to capture, via LiDAR, second data of a current environment of the user at a current time. A second spatial computing map based on the current environment of the user at the current time may be generated and scored. The score for the second spatial computing map may be compared to a threshold to determine whether to process the requested event.

18 Claims, 12 Drawing Sheets

(56) References Cited

U.S. PATENT DOCUMENTS

| | | |
|---|---|---|
| 11,010,747 B2 | 5/2021 | Jones et al. |
| 11,107,102 B2 | 8/2021 | Boal |
| 11,699,153 B2 | 7/2023 | Song et al. |
| 11,769,152 B2* | 9/2023 | Kumar ............... G06Q 20/3674 |
| | | 705/75 |
| 2010/0042846 A1* | 2/2010 | Trotter ................. H04L 63/104 |
| | | 235/375 |
| 2016/0301681 A1* | 10/2016 | Nakazato ................ G06F 21/35 |
| 2017/0006008 A1* | 1/2017 | Moran .................... G06F 21/31 |
| 2018/0060954 A1* | 3/2018 | Yin ......................... H04L 63/08 |
| 2019/0334884 A1* | 10/2019 | Ross ....................... G06F 21/41 |
| 2021/0073933 A1* | 3/2021 | Punnoose ............. H04W 12/64 |
| 2021/0192510 A1 | 6/2021 | Hayhow et al. |
| 2021/0374525 A1* | 12/2021 | Bremer .................. G06N 20/00 |
| 2022/0277064 A1* | 9/2022 | Streit ................... G06V 40/172 |

* cited by examiner

LEVERAGING SPATIAL COMPUTING LIDAR FEEDBACK TO DYNAMICALLY GENERATE IDENTITY PROFILES

BACKGROUND

Aspects of the disclosure relate to electrical computers, systems, and devices for leveraging spatial computing light detection and ranging (LiDAR) feedback to dynamically generate identity profiles and validate users.

As spatial computing becomes more popular, the ability to execute or process one or more events, such as authenticating a user, processing a transaction, or the like, via spatial computing may also become more prevalent. However, it may be possible for unauthorized users to steal or mimic a customer identity using spatial computing in order to execute unauthorized events. Accordingly, it may be advantageous to use LiDAR to capture spatial image data and generate spatial computing maps that may be used to validate or otherwise authenticate a user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with validating an identity of a user via spatial computing.

In some examples, a computing platform may receive, via light detection and ranging (LiDAR) functionality of a spatial computing device, first image data of a first user environment at a first time. The computing platform may extract, from the first image data, metadata. In some examples, the computing platform may generate, based on the extracted metadata, and/or other data, a first spatial computing map of the first user environment at the first time. The computing platform may generate a score corresponding to the first spatial computing map that may indicate a likelihood that a user of the spatial computing device is a valid user and may store the first spatial computing map.

In some examples, the computing platform may receive a request to process an event, such as validating a user, processing a transaction, or the like. Responsive to receiving the request to process the event, the computing platform may transmit an instruction to the spatial computing device causing the spatial computing device to capture, via the LiDAR functionality, second image data of a current environment of the user of the spatial computing device at a current time. Metadata may be extracted from the second image data and the computing platform may generate a second spatial computing map based on the current environment of the user at the current time.

In some arrangements, the second spatial computing map may be analyzed using machine learning to identify any anomalies between the first spatial computing map and the second spatial computing map. The computing platform may score, based on the analysis, the second spatial computing map, wherein the score represents a likelihood that the user of the spatial computing device is the valid user. The generated score for the second spatial computing map may be compared to a threshold and, if the score meets or exceeds the threshold, the event may be processed. If not, one or more validation failure actions may be initiated.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, spatial computing is becoming more popular. Accordingly, as entities enable spatial computing devices to be used to process events, such as executing transactions, or the like, unauthorized users may attempt to mimic a user via spatial computing in order to execute unauthorized transactions.

Accordingly, aspects described herein are directed to using LiDAR enabled spatial computing devices to capture spatial image data that may be used to generate a spatial computing map. In some examples, spatial image data may be captured at one or more predetermined intervals (e.g., every 5 seconds, every second, or the like) in a user environment. Accordingly, a baseline spatial computing map for each user environment (e.g., office, living room, or the like) may be generated.

Upon a user request to process a transaction via the spatial computing device of the user, LiDAR may be used to capture a spatial image of a current environment of the user, generate a spatial computing map of the current environment and compare (e.g., using machine learning models) spatial computing map of the current environment to stored spatial computing maps associated with the user. Machine learning may be used to detect any abnormalities between the spatial computing map of the current environment and the stored spatial computing maps (e.g., of a same environment captured at an earlier time). In some examples, a score may be generated for the spatial computing map of the current environment. The score may indicate a likelihood that the user is a valid user (e.g., based on the machine learning comparison to stored spatial computing maps). In some examples, the score may be compared to a threshold and, if the score meets the threshold, the requested transaction may be processed. If the score falls below the threshold, one or more failure actions may be executed (e.g., the requested transaction may be denied, a fraud notification may be generated, multi-factor authentication may be enabled, or the like).

These and various other arrangements will be discussed more fully below.

Figure 1A:
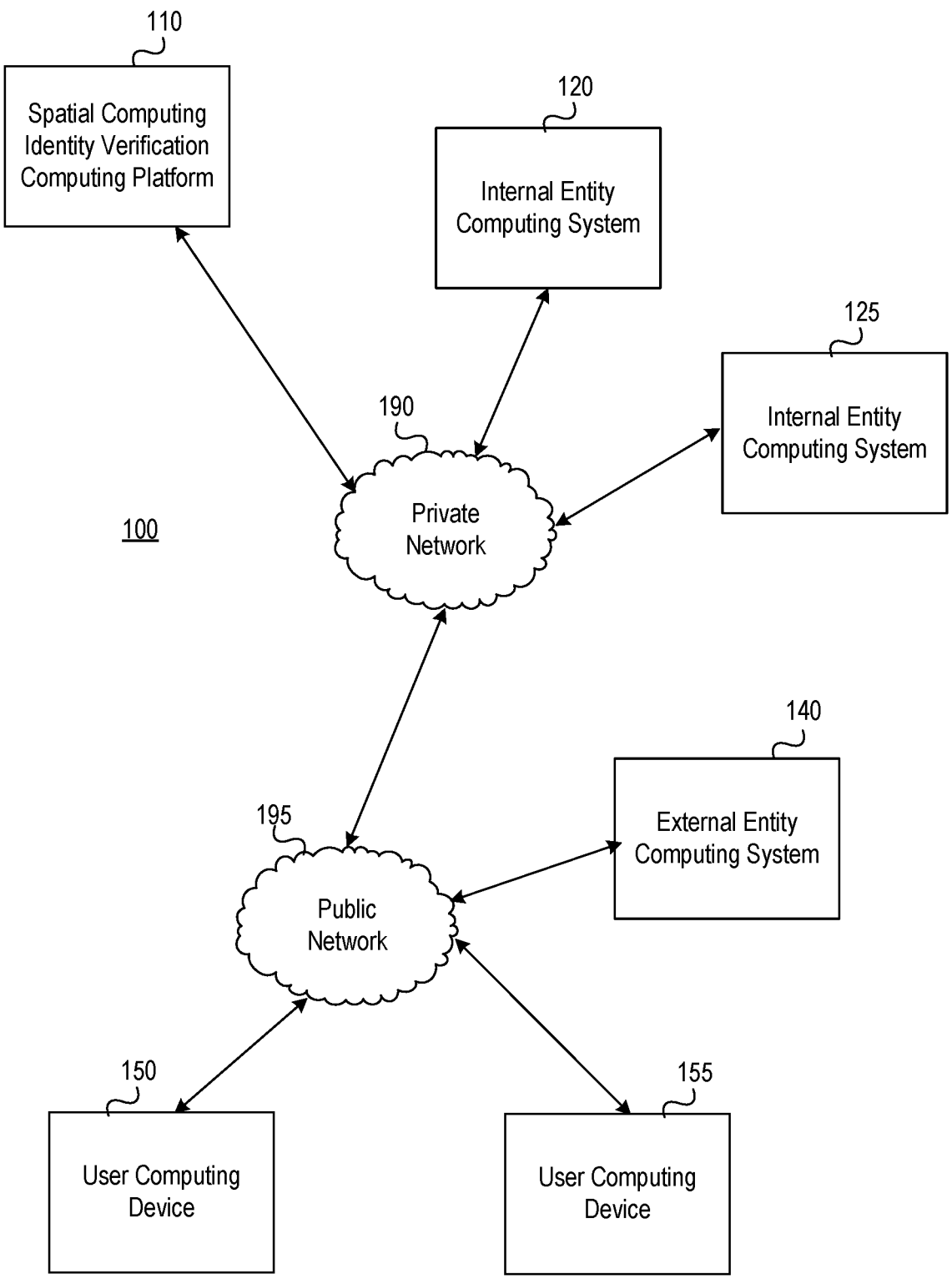
FIGS. 1A-1B depict an illustrative computing environment for leveraging spatial computing LiDAR feedback to dynamically generate identity profiles and validate users in accordance with one or more aspects described herein.
Figure 1B:
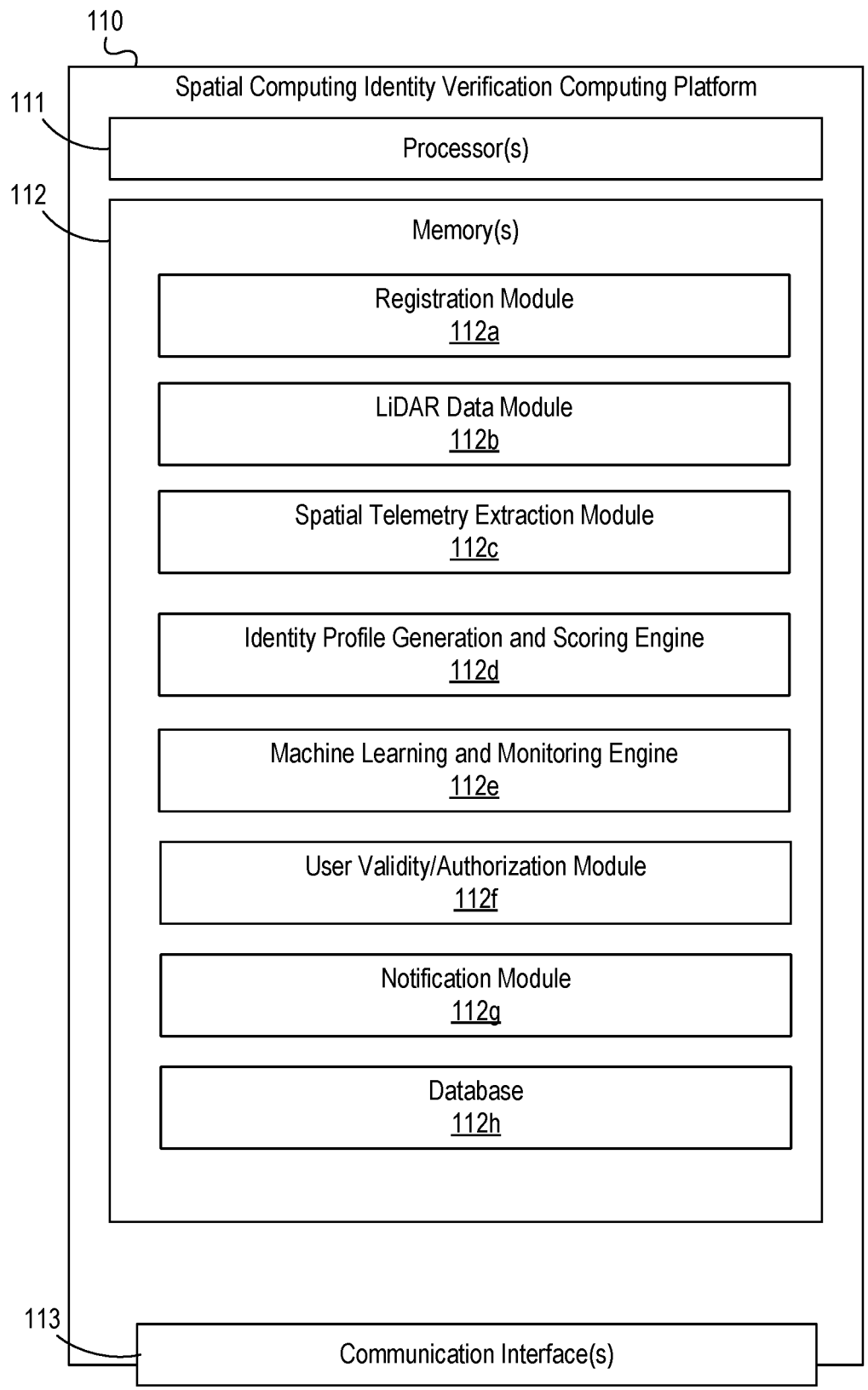

FIGS. 1A-1B depict an illustrative computing environment for implementing processes leveraging spatial computing LiDAR feedback to dynamically generate identity profiles in accordance with one or more aspects described herein. Referring to FIG. 1A, computing environment 100 may include one or more computing devices and/or other computing systems. For example, computing environment 100 may include spatial computing identity verification computing platform 110, internal entity computing system 120, internal entity computing system 125, external entity computing system 140, user computing device 150 and user computing device 155. Although two internal entity computing systems 120, 125, one external entity computing system 140 and two user computing devices 150, 155, are shown, any number of devices may be used without departing from the invention.

Spatial computing identity verification computing platform 110 may be or include one or more computing devices (e.g., servers, server blades, or the like) and/or one or more computing components (e.g., memory, processor, and the like) and may be configured to provide dynamic, efficient, intelligent spatial computing map generation, identity profile generation and identity verification. For instance, spatial computing identity verification computing platform 110 may receive, from a spatial computing device of a user, such as user computing device 150 or user computing device 155, a request to register. The request to register may include user permissions for the system to capture spatial image data, user customization options (e.g., frequency of LiDAR scan), or the like. Upon registering, spatial computing identity verification computing platform 110 may cause a spatial computing device of a user (e.g., user computing device 150 or user computing device 155) to scan, using LiDAR, an environment of the user. In some examples, scans may be performed at periodic intervals (e.g., every 5 seconds, every 3 seconds, or the like). Each scan may capture spatial image data that may then be analyzed (e.g., metadata extracted, and the like) to generate a spatial computing map of the environment. The spatial computing map may include the spatial image data, as well as anchors, overlays, or other virtual objects associated with a virtual environment viewed by the user via the spatial computing device. The spatial computing map may then be stored and used as a baseline for determining or validating an identity of a user (e.g., for transaction processing or other authentication).

Accordingly, upon receiving a request to process a transaction, spatial computing identity verification computing platform 110 may cause the spatial computing device of the user to capture a spatial image of a current environment of the user. The spatial image may be analyzed (e.g., metadata extracted) and a spatial computing map of the current environment may be generated. In some examples, a machine learning model may be used to analyze the spatial computing map of the current environment as compared to stored spatial computing maps to identify any anomalies. In some examples, spatial computing identity verification computing platform 110 may generate a score for the spatial computing map of the current environment. If the score is at or above a threshold, the user may be considered validated and the requested transaction may be processed. If the score is below the threshold, one or more failure actions may be executed.

Internal entity computing system 120 and/or internal entity computing system 125 may be or include one or more computing devices (e.g., servers, server blades, or the like) and/or one or more computing components (e.g., memory, processor, and the like) and may be configured to host or execute one or more enterprise organization applications. For instance, internal entity computing system 120 and/or internal entity computing system 125 may host applications associated with processing transactions, authenticating a user, providing access to user data, updating or modifying an account ledger based on executed transactions, and the like.

External entity computing system 140 may be or include one or more computing devices (e.g., servers, server blades, or the like) and/or one or more computing components (e.g., memory, processor, and the like) and may be configured to host or execute one or more external applications. For instance, external entity computing system 140 may be associated with a third-party (e.g., external to the enterprise organization) payment processing system that may be used to process authorized transactions upon determining that a user is validated.

User computing device 150 and/or user computing device 155 may be or include one or more spatial computing devices that bring together virtual and physical worlds. For instance, user computing device 150 and/or user computing device 155 may be virtual reality, augmented reality and/or mixed reality devices that include LiDAR capabilities to accurately capture dimensions of an environment, positions of objects within the environment, and the like. Accordingly, as a user views their surroundings through the spatial computing device (e.g., user computing device 150, user computing device 155, or the like), spatial image data may be captured (e.g., via LiDAR) and transmitted to the spatial computing identity verification computing platform 110 for analysis and generation of spatial computing maps corresponding to the environment.

As mentioned above, computing environment 100 also may include one or more networks, which may interconnect one or more of spatial computing identity verification computing platform 110, internal entity computing system 120, internal entity computing system 125, external entity computing system 140, user computing device 150 and/or user computing device 155. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, spatial computing identity verification computing platform 110, internal entity computing system 120, and/or internal entity computing system 125, may be associated with an enterprise organization (e.g., a financial institution), and private network 190 may be associated with and/or operated by the organization, and may include one or more networks (e.g., LANs, WANs, virtual private networks (VPNs), or the like) that interconnect spatial computing identity verification computing platform 110, internal entity computing system 120, and/or internal entity computing system 125, and one or more other computing devices and/or computer systems that are used by, operated by, and/or otherwise associated with the organization. Public network 195 may connect private network 190 and/or one or more computing devices connected thereto (e.g., spatial computing identity verification computing platform 110, internal entity computing system 120, and/or internal entity computing system 125) with one or more networks and/or computing devices that are not associated with the organization. For example, external entity computing system 140, user computing device 150, user computing device 155, might not be associated with an organization that operates private network 190 (e.g., because external entity computing system 140, user computing device 150 and/or user computing device 155 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 140, user computing device, 150, and/or user computing device 155 to private network 190 and/or one or more computing devices connected thereto (e.g., spatial computing identity verification computing platform 110, internal entity computing system 120, and/or internal entity computing system 125).

Referring to FIG. 1B, spatial computing identity verification computing platform 110 may include one or more processors 111, memory 112, and communication interface 113. A data bus may interconnect processor(s) 111, memory 112, and communication interface 113. Communication interface 113 may be a network interface configured to support communication between spatial computing identity verification computing platform 110 and one or more networks (e.g., network 190, network 195, or the like). Memory 112 may include one or more program modules having instructions that when executed by processor(s) 111 cause spatial computing identity verification computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of spatial computing identity verification computing platform 110 and/or by different computing devices that may form and/or otherwise make up spatial computing identity verification computing platform 110.

For example, memory 112 may have, store and/or include registration module 112a. Registration module 112a may store instructions and/or data that may cause or enable the spatial computing identity verification computing platform 110 to receive a request to register a user and/or user computing device (e.g., user computing device 150, user computing device 155, or the like). In some examples, the request may be received from the user computing device 150, 155, which may be a spatial computing device. Additionally or alternatively, the request may be received from another user computing device and may provide registration information associated with the user computing device 150, user computing device 155, or the like. The registration data may include user identifying data, device identifying data, user account data, user payment device data, user permissions (e.g., to capture LiDAR data associated with various environments of the user), user customization options (e.g., frequency of LiDAR data/image capture, data sharing permissions, or the like).

Spatial computing identity verification computing platform 110 may further have, store and/or include LiDAR data module 112b. LiDAR data module 112b may store instructions and/or data that may cause or enable the spatial computing identity verification computing platform 110 to receive, from registered spatial computing devices, such as user computing device 150, user computing device 155, or the like, LiDAR data captured by a respective device and/or other types of data captured during a scan or a user environment via the user computing device. In some examples, the LiDAR data may include image data of an environment of a user (e.g., a current environment of a user). The user computing device 150, 155 may capture, using LiDAR technology, a scan or image of a current environment that may be transmitted to the spatial computing identity verification computing platform 110. In some examples, the received data may include any objects, anchors, or overlays included in the spatial computing environment of the user.

Spatial computing identity verification computing platform 110 may further have, store and/or include spatial telemetry extraction module 112c. Spatial telemetry extraction module 112c may store instructions and/or data that may cause or enable the spatial computing identity verification computing platform 110 to extract metadata from the LiDAR data captured and received by the LiDAR data module 112b. In some examples, the extracted metadata may include overlays, anchors or other objects within the spatial computing environment viewed by the user using user computing device 150, user computing device 155, or the like, static and non-static objects or features captured during a scan of the environment, or the like. Spatial telemetry extraction module 112c may store further instructions and/or data that may cause or enable the spatial computing identity verification computing platform 110 to generate a spatial computing map of a current environment of a user based on the received LiDAR and other data, extracted metadata, and the like. The spatial computing map may be for a particular environment at a particular time and may be stored in database 112h. The generated spatial computing maps may be used to establish baseline spatial computing environments for a user (e.g., a living room environment, an office environment, a den environment, a coffee shop environment or the like) that may be used to authenticate or validate an identity of a user.

Spatial computing identity verification computing platform 110 may further have, store, and/or include identity profile generation and scoring engine 112d. Identity profile generation and scoring engine 112d may store instructions and/or data that may cause or enable the spatial computing identity verification computing platform 110 to generate, based on one or more generated spatial computing maps associated with different environments of a user, an identity profile of a user. The identity profile may include a plurality of spatial computing maps for different environments of the user and captured at different times. For instance, the system may capture or scan an environment on a predetermined schedule (e.g., every minute, every 5 seconds, or the like). With each scan or image capture, a spatial computing map may be generated for the current environment of the user and stored in the identity profile (e.g., in database 112*h*).

Identity profile generation and scoring engine 112*d* may store further instructions and/or data to score each spatial computing map based on a likelihood that the user is a valid user. For instance, a machine learning model executed by machine learning and monitoring engine 112*e* may be used to analyze each newly generated spatial computing map with respect to baseline spatial computing maps for the user and a particular environment (e.g., spatial computing maps previously generated for a particular environment of the user) to output any abnormalities between a current or newly generated spatial computing map and baseline spatial computing maps for the user and the environment. Based on the output of the machine learning model, a score indicating a likelihood that a user is a valid user may be generated by the identity profile generation and scoring engine 112*d*. For example, if each spatial computing map is scored on a scale of 0 to 100, with 100 being most likely a valid user, the score may be generated based on a number of abnormalities detected, whether a same abnormality was previously detected in an earlier spatial computing map for the user/environment, a type of abnormality, or the like. Various other scales and scoring arrangements or parameters may be used without departing from the invention.

Machine learning and monitoring engine 112*e* may store instructions and/or data that may cause or enable the spatial computing identity verification computing platform 110 to train, execute, update and/or validate a machine learning model that may output or identify anomalies in spatial computing maps generated for a user and/or environment. Machine learning and monitoring engine 112*e* may further store instructions and/or data that may cause or enable the spatial computing identity verification computing platform 110 to monitor the output of the machine learning model for anomalies detected and take action (e.g., transmit to notification module 112*g*, transmit to user validity/authorization module 11*g*, or the like).

The machine learning model may receive, as inputs, a current or most recently generated spatial computing map for a particular user and environment and execution of the model may cause the model to compare the spatial computing map to previously generated or baseline spatial computing maps for that user and environment. Accordingly, the machine learning model may be trained using historical or previously generated spatial computing maps for a particular user and environment. In some examples, the machine learning model may be updated to remove spatial computing maps generated more than a predetermined time before (e.g., spatial computing maps generated more than 3 years, 5 years, 10 years, or the like, may be removed to avoid potential false positives. Accordingly, the machine learning model may learn to recognize patterns or sequences in spatial computing map data to identify abnormalities.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data identifying detected abnormalities, and the like) and/or unlabeled data.

Spatial computing identity verification computing platform 110 may further have, store and/or include user validity/authorization module 112*f*. User validity/authorization module 112*f* may store instructions and/or data that may cause or enable spatial computing identity verification computing platform 110 to receive a request to process an event (e.g., process a transaction, authenticate a user, or the like) (e.g., from a spatial computing device of user such as user computing device 150, user computing device 155, or the like). Upon receiving the request to process the event, user validity/authorization module 112*f* may transmit an instruction to user computing device 150, user computing device 155, or the like, to capture a current environment of the user (e.g., using LiDAR, capture or scan current surrounding of the user via the user computing device 150, 155). The captured data may be received by the spatial computing identity verification computing platform 110 and processed to generate a current spatial computing map. The current spatial computing map may be score and user validity/authorization module 112*f* may receive the score and compare it to a threshold. For instance, if the score indicating the likelihood that the user is a valid user is at least 80%, 85%, 97% or the like, the requested event may be processed (e.g., instructions may be transmitted to one or more systems or devices to process the transaction). If the score is below the threshold, the event may be rejected, additional user authentication data may be requested (e.g., multi-factor authentication may be required), or the like. In some examples, a user may customize a threshold used to authorize event processing (e.g., during the registration process).

Spatial computing identity verification computing platform 110 may further have, store and/or include notification module 112*g*. Notification module 112*g* may store instructions and/or data that may cause or enable the spatial computing identity verification computing platform 110 to generate and transmit one or more notifications. For instance, notification module 112*g* may generate and transmit notifications indicating whether a requested event is authorized, whether anomalies have been detected in a spatial computing map, or the like.

Database 112*h* may store data related to user registration and customization options, spatial computing maps, generated scores, user profiles, and/or other data that enables performance of aspects described herein by the spatial computing identity verification computing platform 110.

FIGS. 2A-2G depict one example illustrative event sequence for leveraging spatial computing LiDAR feedback to dynamically generate identity profiles and validate users in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
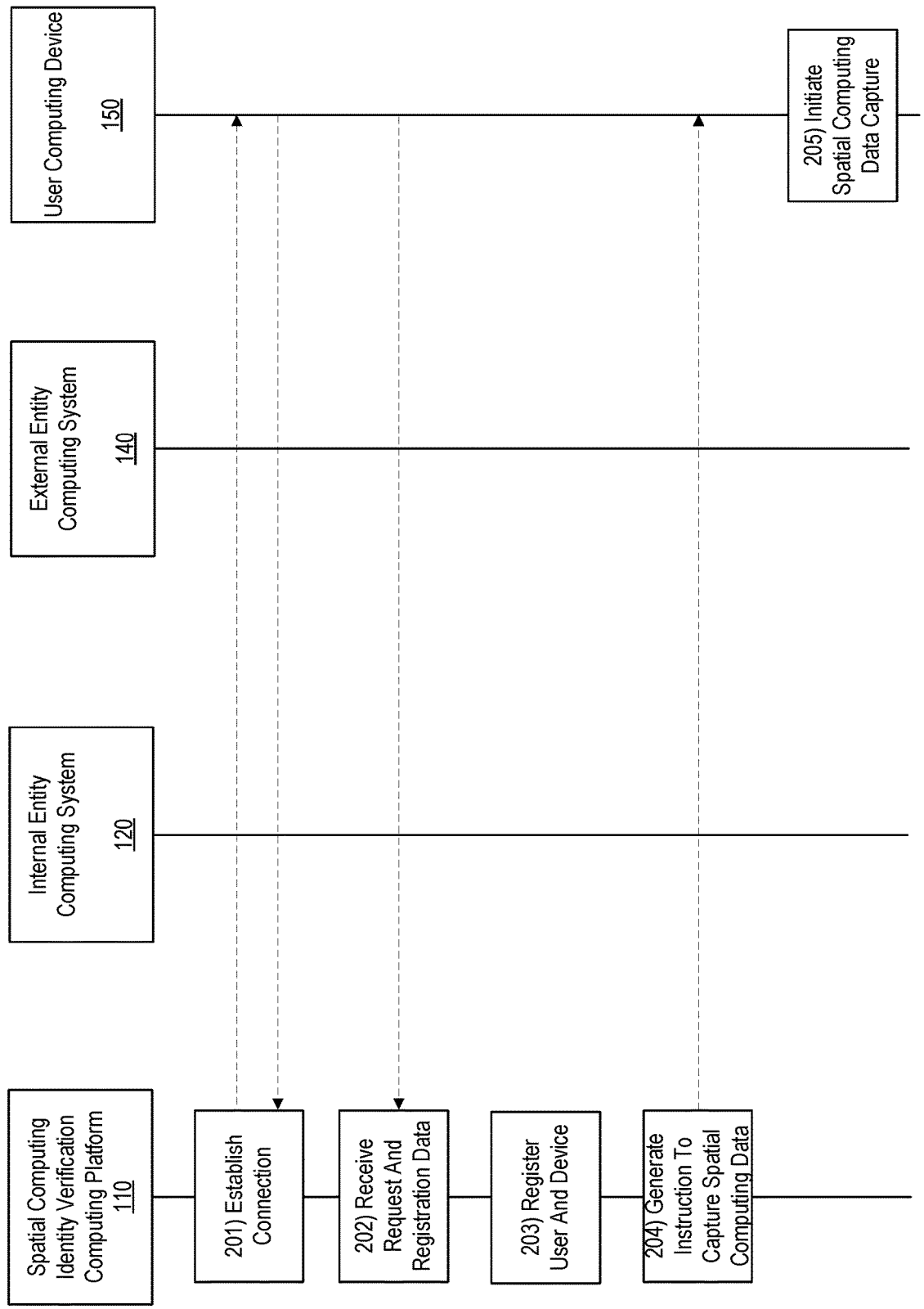
FIGS. 2A-2G depict an illustrative event sequence for leveraging spatial computing LiDAR feedback to dynamically generate identity profiles and validate users in accordance with one or more aspects described herein.

With reference to FIG. 2A, at step 201, spatial computing identity verification computing platform 110 may establish a connection with user computing device 150. For instance, spatial computing identity verification computing platform 110 may establish a first wireless connection with user computing device 150, which may be a spatial computing device of a user. Upon establishing the first wireless connection, a communication session may be initiated between spatial computing identity verification computing platform 110 and user computing device 150.

At step 202, spatial computing identity verification computing platform 110 may receive, from user computing device 150, a request to register the user computing device 150 and a user associated therewith. In some examples, the request to register the user computing device 150 and associated user may include user identifying information, device identifying information, user permission data (e.g., permission to capture image data associated with user environments, permission to share data, permission to process events or access user accounts, or the like), user customization data (e.g., frequency of LiDAR scans by user computing device 150, scoring threshold to process a transaction, or the like), and the like.

At step 203, spatial computing identity verification computing platform 110 may register the user computing device 150 and associated user. For instance, spatial computing identity verification computing platform 110 may update or modify a database, such as database 112*h*, to include the newly registered user computing device, user, and associated registration information.

At step 204, spatial computing identity verification computing platform 110 may generate one or more instructions or commands to cause user computing device 150 to initiate spatial computing data capture functions. For instance, based on one or more customization options received during the registration process (e.g., frequency of scans, or the like), spatial computing identity verification computing platform 110 may generate one or more instructions causing user computing device 150 to initiate spatial computing data capture according to the customization options. Spatial computing identity verification computing platform 110 may transmit or send the generated one or more instructions to the user computing device 150 (e.g., while the first wireless connection is established). In some examples, transmitting or sending the generated one or more instructions may cause the user computing device 150 to execute the instructions.

At step 205, user computing device 150 (e.g., spatial computing device) may receive and execute the generated instructions to initiate spatial computing data capture. For instance, user computing device 150 may execute the instruction and activate or initiate LiDAR functions of user computing device 150 to capture or scan data associated with a current environment of the user.

Figure 2B:
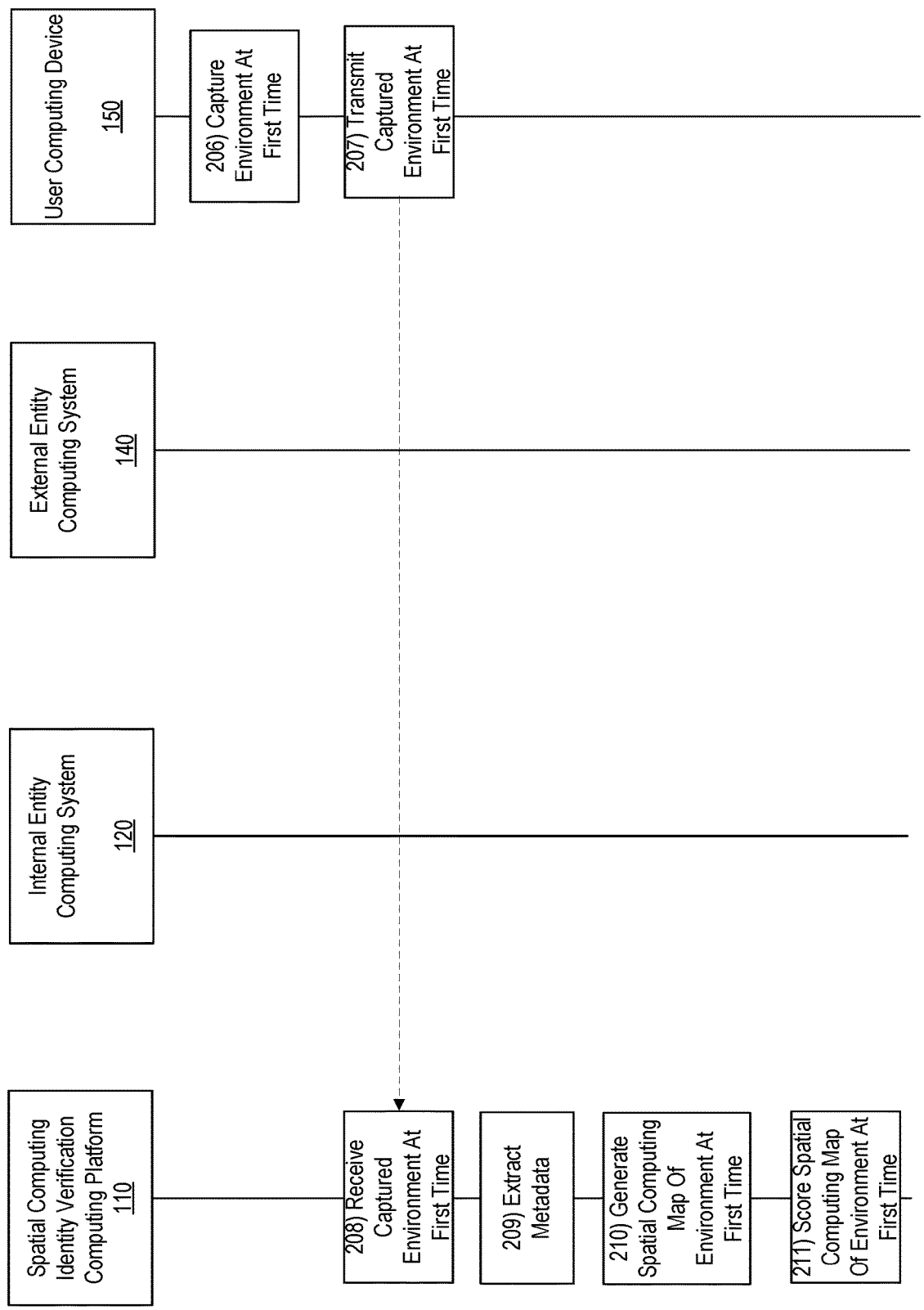

With reference to FIG. 2B, at step 206, user computing device 150 may scan or capture data associated with a first environment at a first time. For instance, based on a selected frequency of scan, user computing device 150 may capture or scan a current environment of the user (e.g., a three-dimensional image as viewed via the spatial computing aspects of user computing device 150) at the selected frequency. At step 206, a first environment of the user (e.g., a current environment) may be scanned or data captured at a first time (e.g., a current time). In capturing or scanning a current environment of the user, user computing device 150 may capture, via LiDAR, physical dimensions, distances, heights, and the like, of objects within the environment. Further, the data capture or scan may capture virtual objects viewed via the spatial computing functionality of user computing device 150, such as virtual objects or anchors that overlay the appearance of the physical environment on the user computing device 150 display.

At step 207, user computing device 150 may transmit or send the captured data associated with the first environment at the first time to the spatial computing identity verification computing platform 110 (e.g., during the communication session initiated upon establishing the first wireless connection). At step 208, spatial computing identity verification computing platform 110 may receive the captured data associated with the first environment at the first time and may store the data.

At step 209, spatial computing identity verification computing platform 110 may extract metadata from the captured data. For instance, metadata associated with the LiDAR data, objects, anchors, overlays, or the like, may be extracted.

At step 210, spatial computing identity verification computing platform 110 may generate a first spatial computing map of the first environment at the first time. For instance, based on the received data, extracted metadata, and the like, spatial computing identity verification computing platform 110 may generate a first spatial computing map corresponding to the first environment at the first time (e.g., including positions and/or dimensions of physical objects within the environment at that time, including virtual objects within the environment at the time, and the like). In some examples, the spatial computing map may include static information captured from the environment (e.g., physical objects within the space, a pattern on wallpaper within the space, or the like) as well as non-static objects or features, such as lighting within the space (e.g., from lights turned on or off, from sunlight through a window or the like), changing images on a television that is displaying something, or the like.

At step 211, spatial computing identity verification computing platform 110 may score the first spatial computing map for the first environment at the first time. For instance, the first spatial computing map of the first environment may, in some examples, be given a low score to indicate lack of confidence that the user is valid because it is the first spatial computing map and there is not baseline data to compare the first spatial computing map to. Alternatively, in some examples, the first spatial computing map may be given a high score or perfect score if operating on the assumption that the first data captured for a user that requested registration is very likely to be the valid user and, accordingly, a high score may be generated for the first spatial computing map.

Figure 2C:
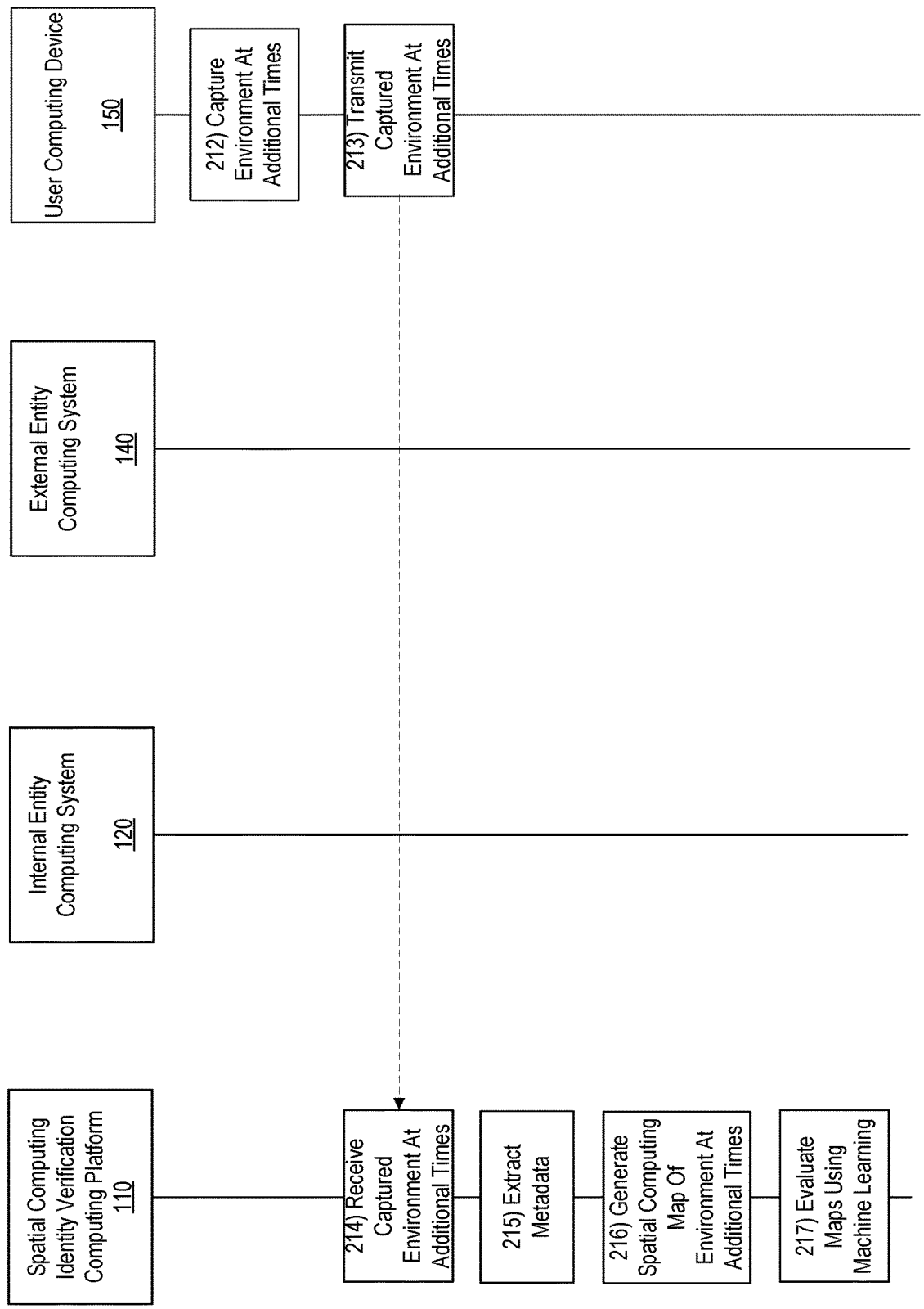

With reference to FIG. 2C, at step 212, user computing device 150 may scan or capture data associated with the first environment at additional times. For instance, based on the frequency of scanning, user computing device 150 may capture additional data associated with the first environment according to the identified frequency of scans (e.g., every 5 seconds, every minute, or the like). Similar to the scan of the first environment at the first time, data associated with the first environment may be captured at subsequent additional times according to the desired frequency. In capturing or scanning a current environment of the user, user computing device 150 may capture, via LiDAR, physical dimensions, distances, heights, and the like, of objects within the environment at a current time of the capture. Further, the data capture or scan may capture virtual objects viewed via the spatial computing functionality of user computing device 150, such as virtual objects or anchors that overlay the appearance of the physical environment on the user computing device 150 display at a current time of the data capture.

At step 213, user computing device 150 may transmit or send the captured data associated with the first environment at additional times to the spatial computing identity verification computing platform 110 (e.g., during the communication session initiated upon establishing the first wireless connection). In some examples, the data associated with the additional scans of the first environment at additional times may be transmitted or sent to the spatial computing identity verification computing platform 110 as they are captured. Additional or alternatively, the scanned data may be sent in a batch process.

At step 214, spatial computing identity verification computing platform 110 may receive the captured data associated with the first environment at additional times and may store the data.

At step 215, spatial computing identity verification computing platform 110 may extract metadata from the captured data. For instance, metadata associated with the LiDAR data, objects, anchors, overlays, or the like, may be extracted.

At step 216, spatial computing identity verification computing platform 110 may generate additional spatial computing maps of the first environment at the additional times. For instance, based on the received data, extracted metadata, and the like, spatial computing identity verification computing platform 110 may generate additional spatial computing maps corresponding to the first environment at the additional times (e.g., including positions and/or dimensions of physical objects within the environment at that time, including virtual objects within the environment at the time, and the like). In some examples, a spatial computing map may be generated for the first environment for each time that data is captured. Accordingly, a user profile may be generated including a plurality of spatial computing maps for the first environment and the first user. This plurality of spatial computing maps may be used as baseline data to establish a valid identity of the user.

At step 217, spatial computing identity verification computing platform 110 may analyze each spatial computing map generated using machine learning. For instance, a machine learning model trained on historical data associated with various user environments may receive, as inputs, a spatial computing map and associated data. The machine learning model may be executed to analyze the spatial computing map to identify any abnormalities or anomalies in the spatial computing map being analyzed (e.g., differences between a spatial computing map being analyzed and previously generated spatial computing maps for the user and environment). The machine learning model may then output any identified abnormalities.

Figure 2D:
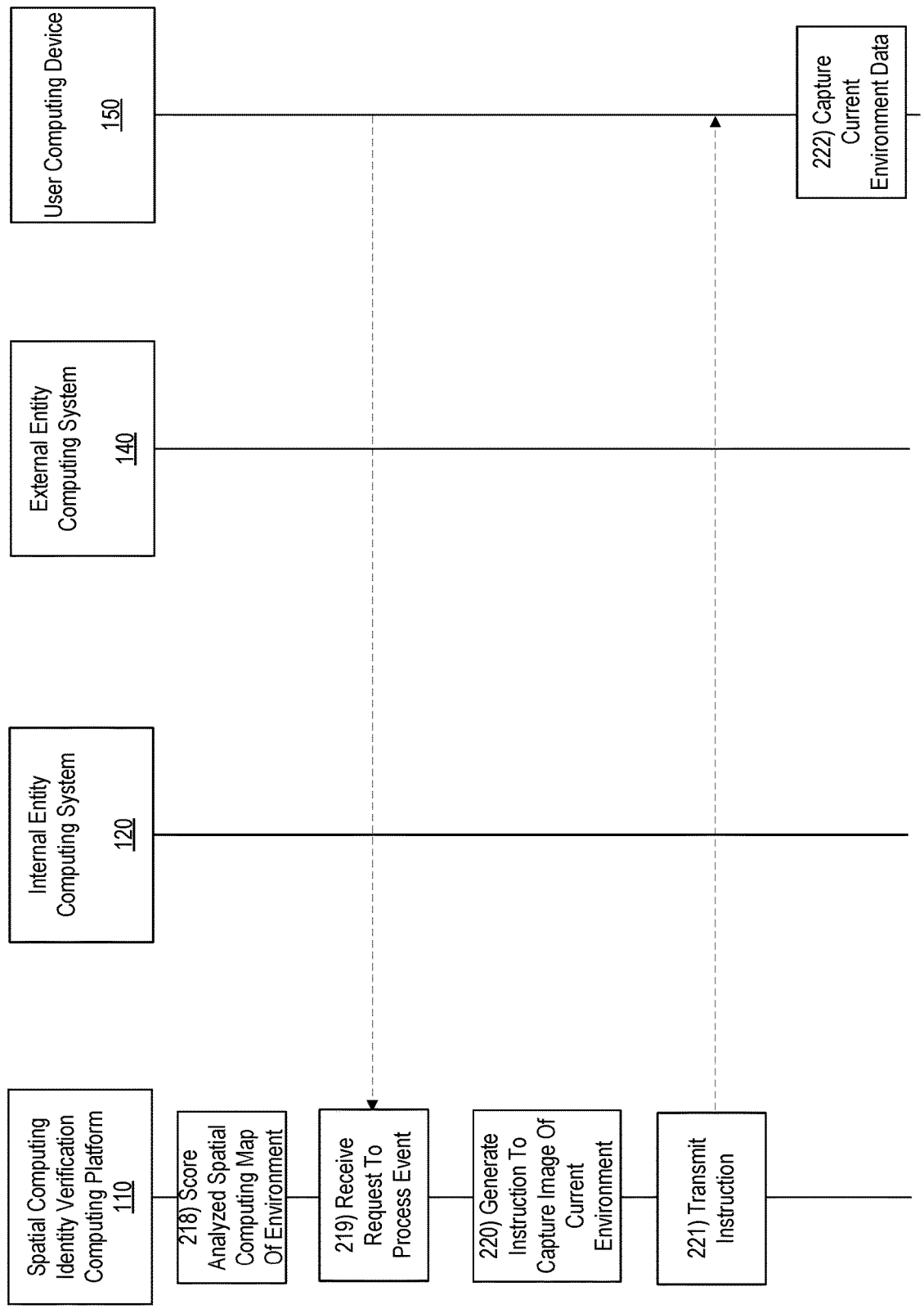

With reference to FIG. 2D, at step 218, spatial computing identity verification computing platform 110 may score the analyzed spatial computing map for the first environment. For instance, based on any anomalies detected in the machine learning analysis of the spatial computing map, a score may be generated for the analyzed spatial computing map. In some examples, each abnormality detected may cause a deduction from a perfect score (e.g., if a scale of 0-100 is used, with 100 being a perfect score, each abnormality may cause a 10 point deduction). In another example, detected abnormalities may be weighted (e.g., a change of position of an easily movable physical item in an environment, such as a book on a coffee table, may be weighted less than a change of position of a television within the room, a change or omission of a virtual object overlaying the environment, a difference in an image associated with a television display may be weighted as less significant than anomalies that are less likely to change often, or the like). Various other scoring arrangements may be used without departing from the invention.

The generated spatial computing maps (e.g., for the environment at all times), scores, captured data, and the like, may be stored by the spatial computing identity verification computing platform 110 in the database 112*h* (e.g., in a user profile of a user).

Although the arrangements described including capturing data associated with a first environment at multiple times, data associated with a plurality of user environments may be captured, analyzed, scored and stored in, for instance, a user profile. For instance, as a user moves throughout a day and visits different environments (e.g., a living room, a kitchen, an office, or the like) data associated with each environment may be captured, analyzed and stored in the user profile. Accordingly, a registered user may have baseline data for a plurality of environments that may be used to authenticate or validate a user.

At step 219, spatial computing identity verification computing platform 110 may receive, from user computing device 150, a request to process an event. For instance, spatial computing identity verification computing platform 110 may receive a request to process a transaction, authenticate a user, or the like, from the user computing device 150.

At step 220, spatial computing identity verification computing platform 110 may generate an instruction to capture current environment data of the user computing device (e.g., using LiDAR, capture the current environment being experienced by the user via the spatial computing functions of user computing device 150, including physical objects within the space as well as virtual objects overlaying the display of the physical space).

At step 221, spatial computing identity verification computing platform 110 may transmit or send the generated instruction to the user computing device 150. In some examples, transmitting or sending the instruction may cause the user computing device 150 to execute the instruction.

At step 222, user computing device 150 may receive the instruction, execute the instruction, and, accordingly, capture data associated with the current environment of the user. For instance, as discussed herein, LiDAR may be used to capture physical attributes of a room or environment the user is currently in (e.g., distances, dimensions of objects, and the like), and virtual objects overlaying a display of the current physical environment may be captured.

Figure 2E:
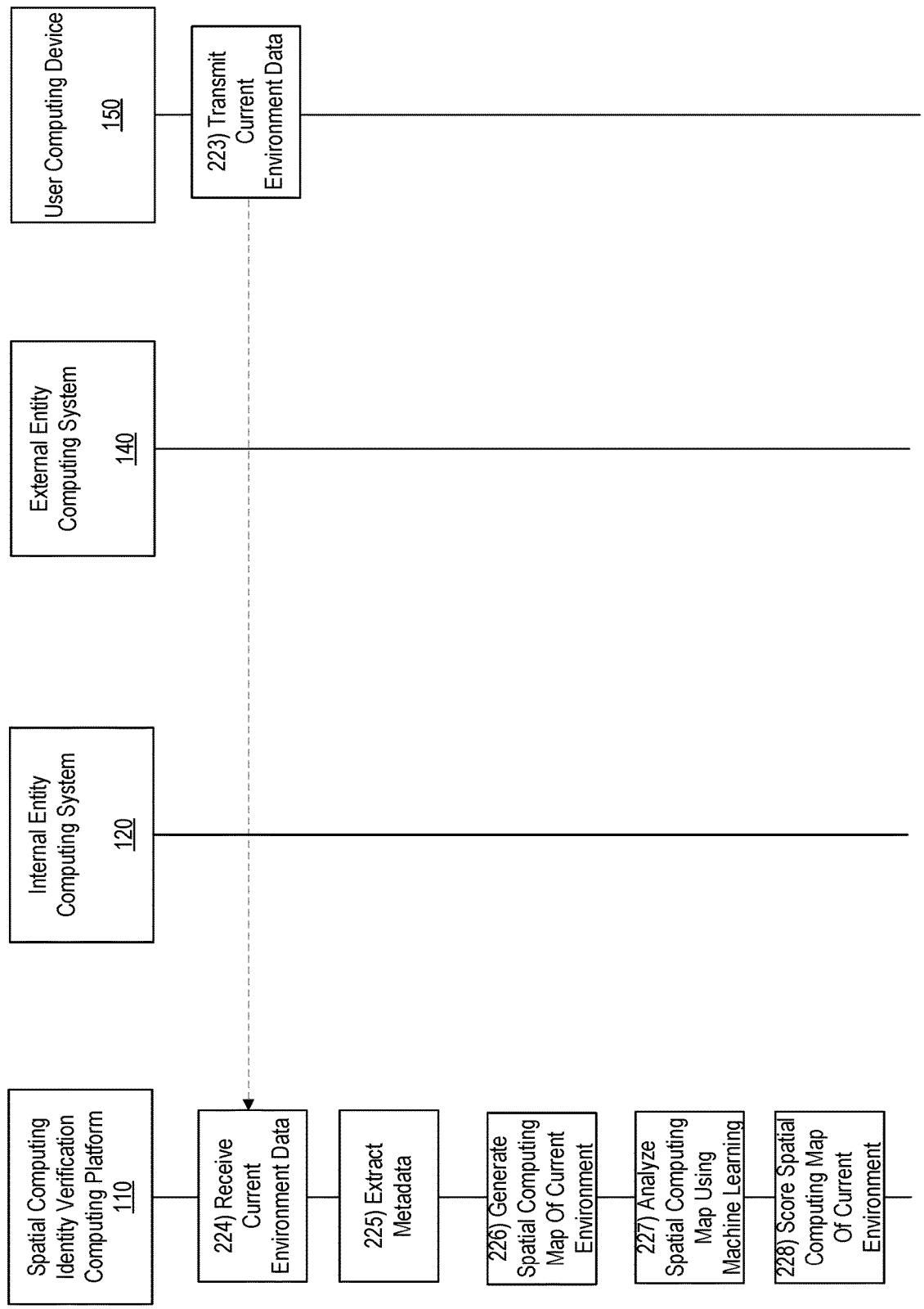

With reference to FIG. 2E, at step 223, user computing device 150 may transmit or send the captured data associated with the current environment of the user. At step 224, spatial computing identity verification computing platform 110 may receive the transmitted data associated with the current environment of the user.

At step 225, spatial computing identity verification computing platform 110 may extract metadata from the received data associated with the current environment. For instance, metadata associated with the LiDAR data, objects, anchors, overlays, or the like, may be extracted.

At step 226, spatial computing identity verification computing platform 110 may generate a current spatial computing map of the current environment of the user. For instance, based on the received data, extracted metadata, and the like, spatial computing identity verification computing platform 110 may generate a current spatial computing map corresponding to the current environment of the user (e.g., including positions and/or dimensions of physical objects within the environment at that time, including virtual objects within the environment at the time, and the like).

At step 227, may analyze the current spatial computing map generated using machine learning. For instance, the machine learning model may be executed to analyze the current spatial computing map to identify any abnormalities in the current spatial computing map being analyzed (e.g., differences between the current spatial computing map being analyzed and previously generated spatial computing maps for the user and environment). The machine learning model may then output any identified abnormalities.

At step 228, spatial computing identity verification computing platform 110 may score the current spatial computing map for the current environment of the user.

Figure 2F:
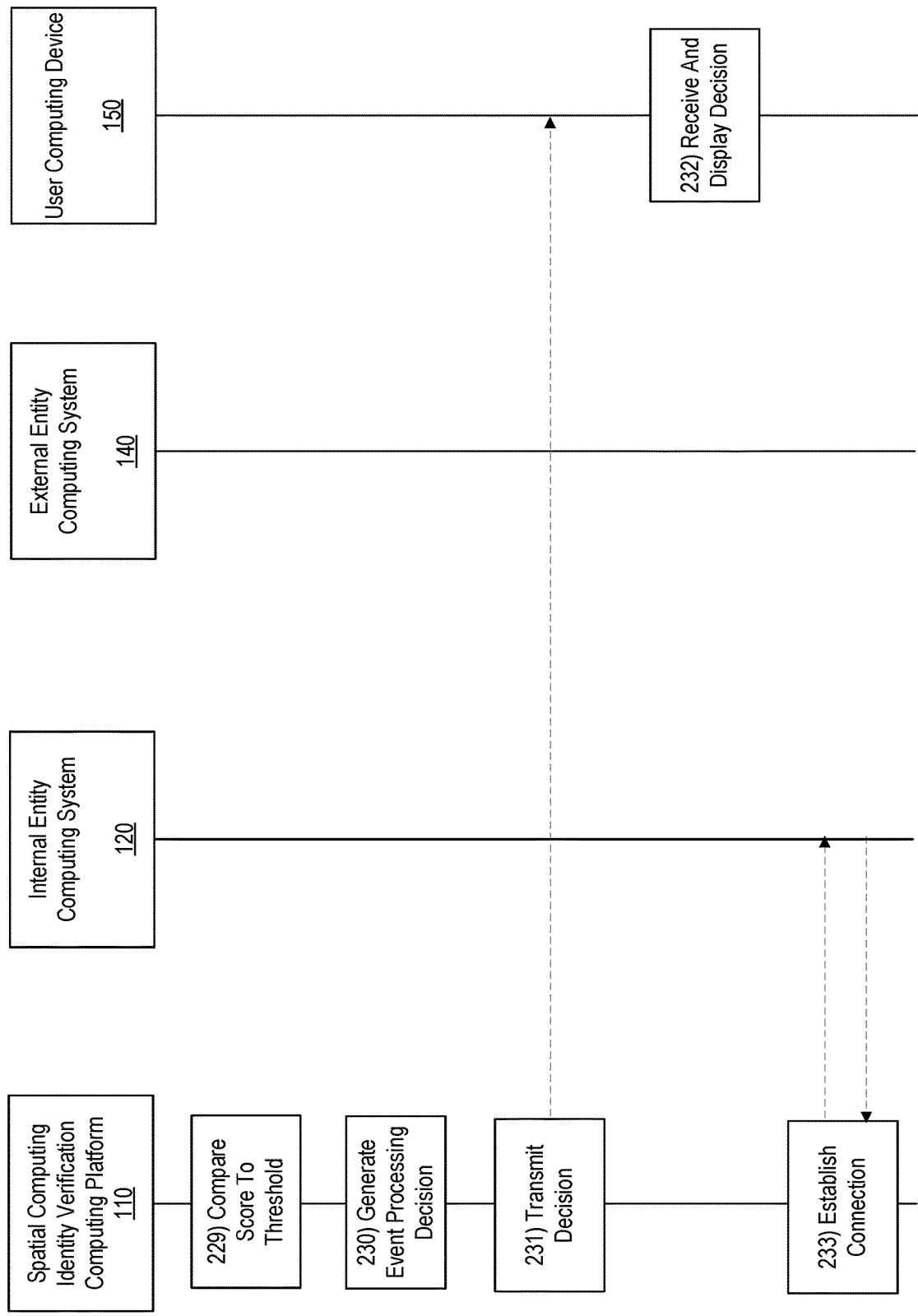

With reference to FIG. 2F, at step 229, spatial computing identity verification computing platform 110 may compare the score generated for the current spatial computing map to a threshold for processing events. In some examples, the threshold may be determined by the user (e.g. during a registration process). In some arrangements, the threshold may vary based on type of event being processed, amount associated with an event (e.g., transactions having an amount above a threshold may have a higher score threshold), or the like.

At step 230, spatial computing identity verification computing platform 110 may generate an event processing decision. For instance, if the score meets or exceeds the threshold, spatial computing identity verification computing platform 110 may generate a decision to process the requested event. If the score does not meet or exceed the threshold, the spatial computing identity verification computing platform 110 may generate a decision to initiate one or more verification failure actions, such as denying the requested event, initiating additional authentication measures (e.g., multi-factor authentication, request additional authentication data, or the like), initiating a potential fraud alert or notification, or the like.

Figure 4:
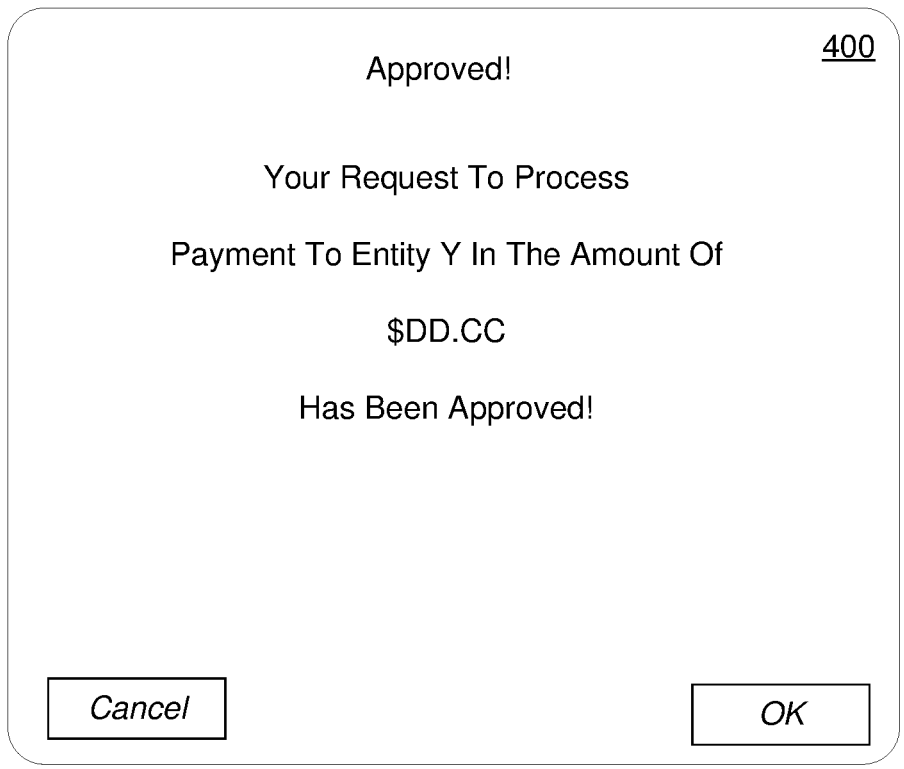
FIGS. 4 and 5 illustrate example graphical user interfaces that may be generated in accordance with one or more aspects described herein.
Figure 5:
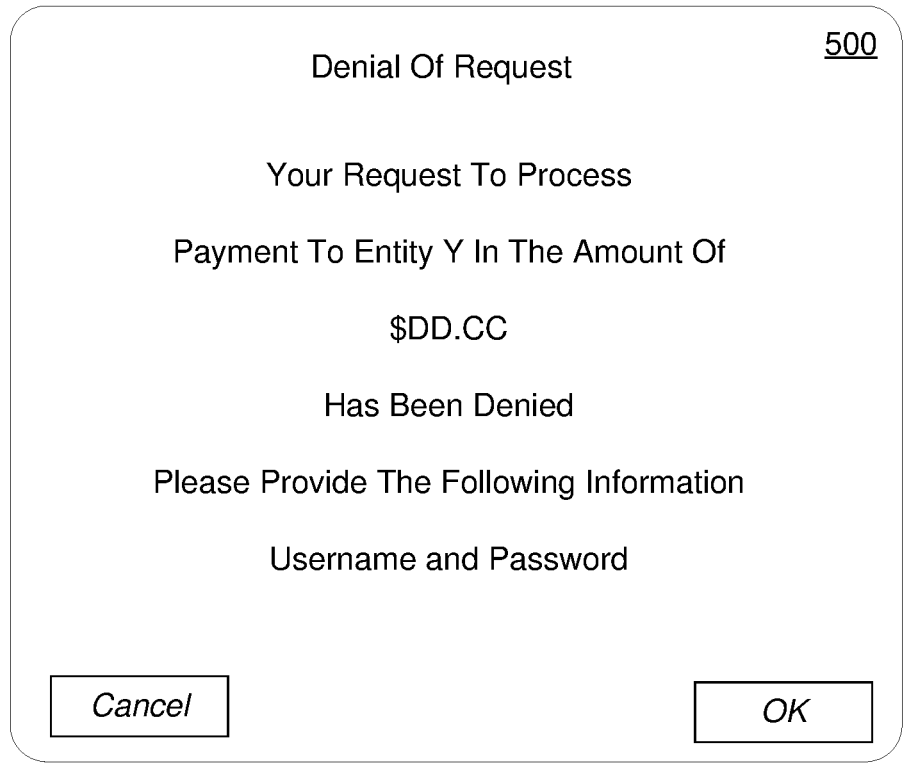

At step 231, spatial computing identity verification computing platform 110 may transmit or send the generated decision to user computing device 150. For instance, a notification may be generated including the generated decision, and transmitting or sending decision may cause the user computing device to display the generated notification including the decision. For instance, if the requested event is approved, a notification such as user interface 400 shown in FIG. 4 may be transmitted to the user computing device 150. Interface 400 includes an indication of the requested event (e.g., type of event, amount of event, other parties to the event, or the like), as well as an indication that the event was approved. Alternatively, if the requested event is not approved, a notification such as user interface 500 shown in FIG. 5 may be transmitted to user computing device 150. Interface 500 includes an indication of the requested event, that the event was denied and may include one or more additional requests (e.g., additional authentication data requested, initiation of multi-factor authentication, or the like).

At step 232, user computing device 150 may receive and display the notification.

At step 233, if the requested event was authorized, spatial computing identity verification computing platform 110 may establish a connection with internal entity computing system 120. For instance, spatial computing identity verification computing platform 110 may establish a second wireless connection with internal entity computing system 120. Upon establishing the second wireless connection, a communication session may be initiated between spatial computing identity verification computing platform 110 and internal entity computing system 120.

Figure 2G:
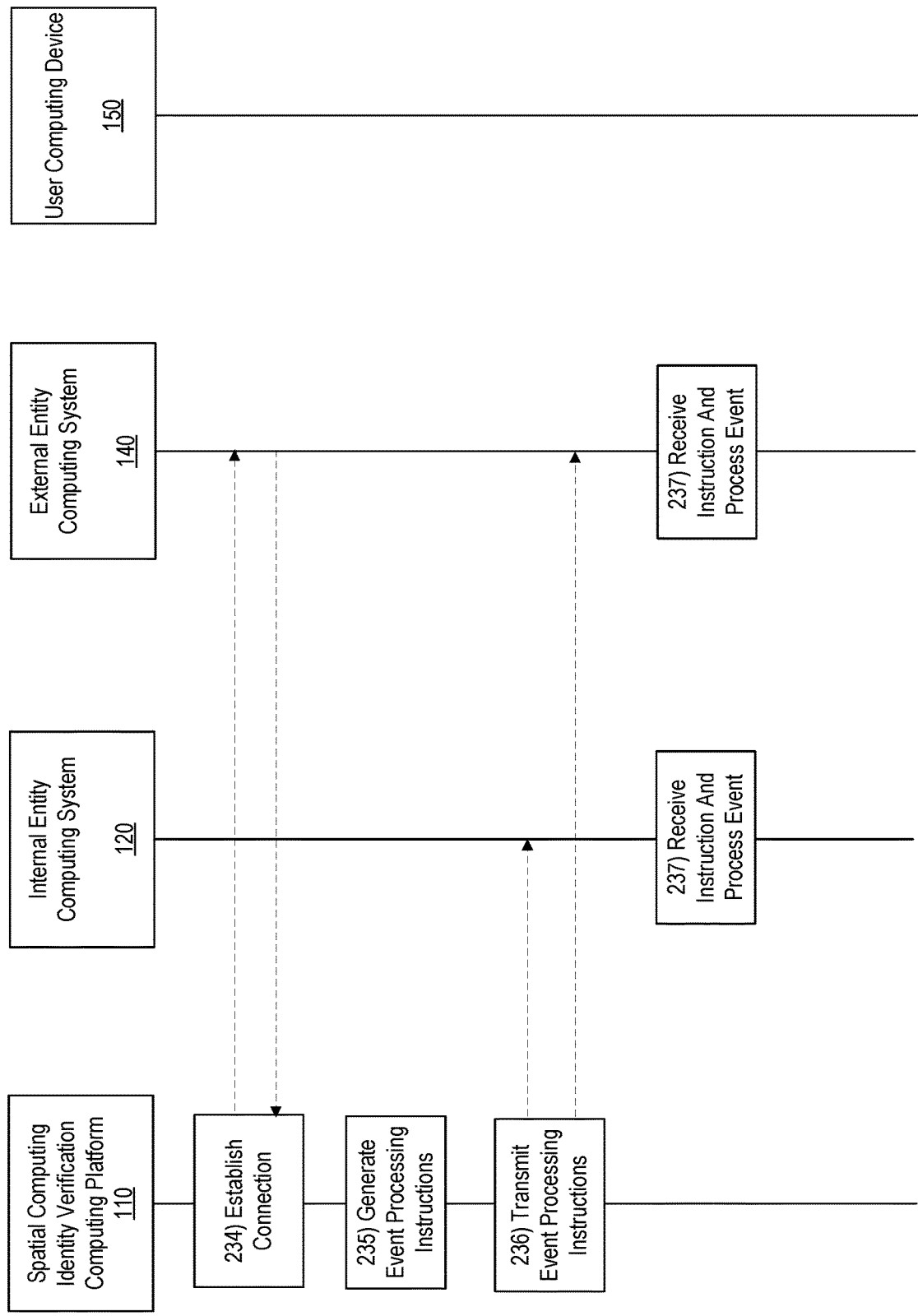

With reference to FIG. 2G, at step 234, if the requested event was authorized, spatial computing identity verification computing platform 110 may establish a connection with external entity computing system 140. For instance, spatial computing identity verification computing platform 110 may establish a third wireless connection with external entity computing system 140. Upon establishing the third wireless connection, a communication session may be initiated between spatial computing identity verification computing platform 110 and external entity computing system 140.

At step 235, spatial computing identity verification computing platform 110 may generate one or more event processing instructions. For instance, spatial computing identity verification computing platform 110 may generate one or more instructions to withdraw funds from a particular account, cause a third-party system to process an event, or the like.

At step 236, spatial computing identity verification computing platform 110 may transmit or send the generated instructions to the internal entity computing system 120 and external entity computing system 140. At step 237, internal entity computing system 120 and external entity computing system 140 may receive the instruction and execute the instruction to process the event.

Although the arrangements shown including transmitting event processing instructions to both internal entity computing system 120 and external entity computing system 140, in some arrangements, based on the type of event, instructions may be sent to one of internal entity computing system 120 or external entity computing system 140 for processing the event.

Figure 3:
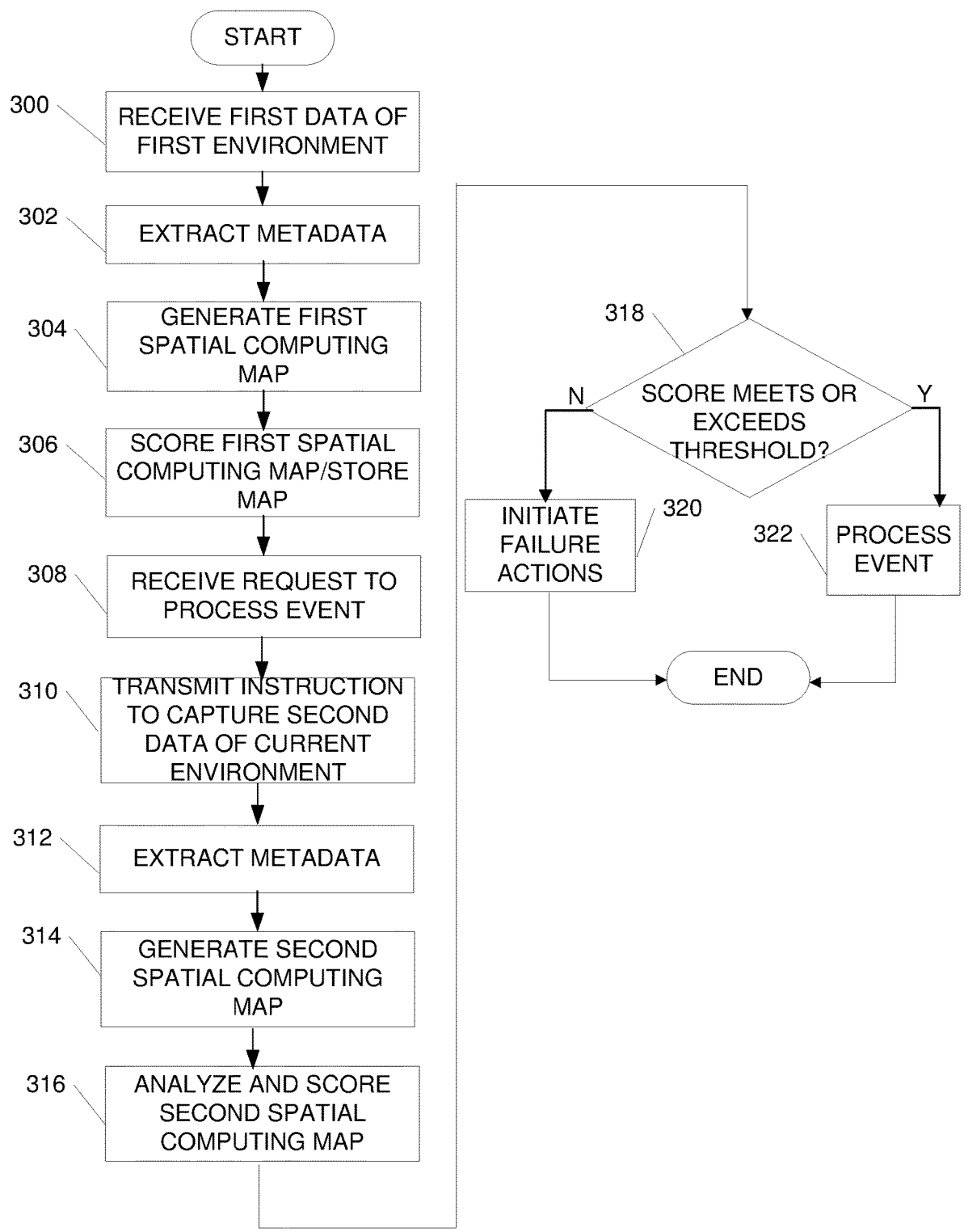
FIG. 3 depicts an illustrative method for leveraging spatial computing LiDAR feedback to dynamically generate identity profiles and validate users in accordance with one or more aspects described herein.

FIG. 3 is a flow chart illustrating one example method of leveraging spatial computing LiDAR feedback to dynamically generate identity profiles and validate users in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as spatial computing identity verification computing platform 110, may receive, via LiDAR functionality of a spatial computing device, such as user computing device 150, first image data of a first user environment at a first time. In some examples, the first image data may include spatial data including physical distances, dimensions, and the like, of the physical space that makes up the first user environment and physical objects within the physical space (e.g., as viewed via the spatial computing device). In some examples, the first image data may include virtual objects, anchors or overlays overlaying the first user environment when viewed via the spatial computing device, and/or mixed reality objects, scripts associated with virtual objects, and the like.

At step 302, the computing platform may extract metadata from the first image data. For instance, metadata associated with static and non-static objects within the first image data may be extracted.

At step 304, based on the extracted metadata, a first spatial computing map of the first user environment at the first time may be generated. For instance, based on the extracted metadata and/or other data associated with the first image data, a spatial computing map representing the first user environment, as well as physical and virtual objects therein, at the first time, may be generated.

At step 306, a score may be generated for the first spatial computing map. In some examples, the score may indicate a likelihood that the user is a valid user of the spatial computing device. In some examples, a first spatial computing map of the first user environment at the first time may have a score of 1 (on a scale of 0 to 1 where one is most likely to be a valid user) because it is the initial instance of the spatial computing map of that environment. As additional spatial computing maps are generated (e.g., based on subsequent scans and spatial image data), a score may be generated for each spatial computing map and may be based on a machine learning analysis of a current spatial computing map compared to previous spatial computing maps for that particular environment for that user. The computing platform may store the first spatial computing map and associated score.

At step 308, the computing platform may receive a request to process an event, such as process a transaction, authenticate a user, or the like. In some examples, the request may include a request to process a payment and may include information related to the payment (e.g., account from which funds should be withdrawn, payment device, parties to the transaction, and the like).

At step 310, responsive to receiving the request to process the event, the computing platform may generate and transmit or send, to the spatial computing device (e.g., user computing device 150) an instruction causing the spatial computing device to capture, via LiDAR functionality of the spatial computing device, second image data of a current environment of the user of the spatial computing device at the current time. For instance, the environment in which the user is currently present may be captured via LiDAR, and additional image data, object data, and the like, may be captured. The current environment may be a same environment as the first user environment.

At step 312, metadata may be extracted from the second image data. For instance, metadata associated with physical objects as well as virtual objects, static as well as non-static objects, and the like, may be extracted. At step 314, a second spatial computing map of the current environment at the current time may be generated from the extracted metadata and/or other data.

At step 316, the second spatial computing map may be analyzed, using machine learning, to identify any anomalies between the second spatial computing map and spatial computing maps previously captured for the current environment (e.g., first spatial computing map of the first user environment at the first time). In some examples, a score of the second spatial computing map may be generated based on the machine learning analysis indicating a likelihood that the user is a valid user. In arrangements in which spatial computing maps of a plurality of user environments are generated and stored, the spatial computing map of the current environment of the user may be analyzed against pre-stored (e.g., previously generated and stored) spatial computing maps corresponding to a same environment (e.g., one of a plurality of user environments such as a kitchen, office, living room, frequented coffee shop, or the like). In some examples, the machine learning model may be trained using historical data including the first spatial computing map of the first user environment at the first time.

At step 318, the score for the second spatial computing map may be compared to a threshold. If the score meets or exceeds the threshold, the requested transaction may be processed at step 320. If the score does not meet or exceed the threshold, one or more validation failure actions may be initiated. For instance, the requested transaction may be denied, a fraud notification may be generated, multi-factor authentication may be enabled and/or user authentication data may be requested, and the like.

Accordingly, the arrangements described herein provide for dynamic generation of identity profiles and user validation based on LiDAR feedback data from a spatial computing device. The arrangements described herein provide user validation and authentication when processing transactions in a spatial computing system or AR/VR/mixed reality environment.

For instance, as use of spatial computing devices to process events, such as user authentication, transaction processing, or the like, become more common, unauthorized actors may attempt to mimic or impersonate a user to gain access to data, access funds or accounts without authorization, or the like. Accordingly, the arrangements described herein may establish an identity profile for a user based on common or frequently visited surroundings of the user as captured via a spatial computing device. The arrangements leverage LiDAR functionality in spatial computing devices (e.g., user computing device 150) to establish baseline data for different user environments (e.g., user profile based on spatial computing maps generated for the various environments at various times) and may use the baseline data to detect anomalies in current environment data captured in response to a request to process an event.

For instance, spatial computing devices of a user (e.g., user computing device 150, user computing device 155, or the like) may capture a 360 degree view of surroundings and permit or enable users to virtually anchor objects to those surrounds (e.g., by anchoring or overlaying objects on a display of the environment of the user). Use of LiDAR to scan the surroundings or physical environment of the user captures distances between objects, depth or dimensions of objects in the surroundings, or the like. The use of LiDAR improves accuracy and precision associated with capture and analysis of a physical environment, objects within the environment, and the like. Accordingly, even if an unauthorized actor created an unauthorized spatial image or map of a user environment, it would be highly unlikely or nearly impossible for the unauthorized actor to have captured the environment with the accuracy of the LiDAR-based arrangements described herein, and, as such, the environment and associated unauthorized user, when evaluated to authorize a transaction, will be identified as not validated.

Accordingly, while objects within a particular type of environment may be similar for different users (e.g., different users may have a same television or same piece of art), the particular physical arrangement of the physical objects within the room (e.g., height on wall, distance from seating, or the like) may make the data captured via LiDAR unique to a particular user, and may enable use of the LiDAR feedback data to authenticate or validate a user, process events, and the like.

For instance, by generating a spatial computing map based on LiDAR data, extracted metadata, and the like, the spatial computing map may include precise or exact positions of walls of a room, physical objects within a room, position and depth of objects in a room, as well as virtual objects overlaying the environment on the spatial computing device and scripts associated with those objects, that may be unique to the user and may be used to validate an identity of a user. The system may generate a plurality of spatial computing maps (e.g., based on frequency of scanning) for a plurality of environments for each user and may store the spatial computing maps in a user profile that may be used to analyze currently captured environment data to validate the user, process events, and the like.

The arrangements described herein may encrypt data captured from user environments to maintain privacy of users (e.g., family pictures, private papers within the environment during a data capture of the environment, or the like, may be maintained as private via encryption). In some examples, scores generated may also be encrypted. In some examples, homomorphic encryption may be used to encrypt data received from the spatial computing device (e.g., analysis of data may be performed in a homomorphic encryption layer to preserve user or data privacy).

Figure 6:
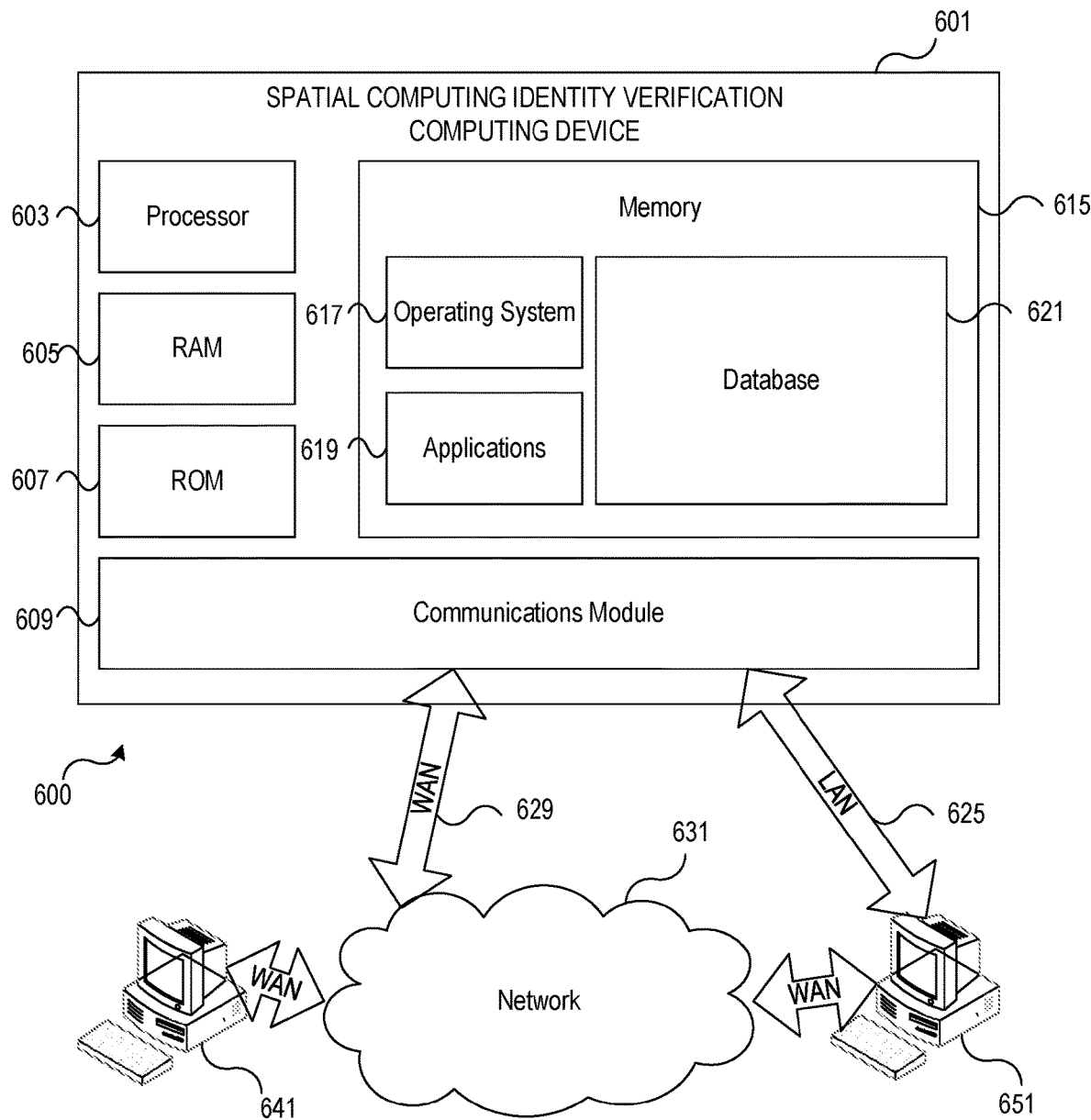
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include spatial computing identity verification computing device 601 having processor 603 for controlling overall operation of spatial computing identity verification computing device 601 and its associated components, including Random Access Memory (RAM) 605, Read-Only Memory (ROM) 607, communications module 609, and memory 615. Spatial computing identity verification computing device 601 may include a variety of computer readable media. Computer readable media may be any available media that may be accessed by spatial computing identity verification computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EE-PROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by spatial computing identity verification computing device 601.

Although not required, various aspects described herein may be embodied as a method, a data transfer system, or as a computer-readable medium storing computer-executable instructions. For example, a computer-readable medium storing instructions to cause a hardware processor to perform steps of a method in accordance with aspects of the disclosed embodiments is contemplated. For example, aspects of method steps disclosed herein may be executed on a processor on spatial computing identity verification computing device 601. Such a processor may execute computer-executable instructions stored on a computer-readable medium.

Software may be stored within memory 615 and/or storage to provide instructions to processor 603 for enabling spatial computing identity verification computing device 601 to perform various functions as discussed herein. For example, memory 615 may store software used by spatial computing identity verification computing device 601, such as operating system 617, application programs 619, and associated database 621. Also, some or all of the computer executable instructions for spatial computing identity verification computing device 601 may be embodied in hardware or firmware. Although not shown, RAM 605 may include one or more applications representing the application data stored in RAM 605 while spatial computing identity verification computing device 601 is on and corresponding software applications (e.g., software tasks) are running on spatial computing identity verification computing device 601.

Communications module 609 may include a microphone, keypad, touch screen, and/or stylus through which a user of spatial computing identity verification computing device 601 may provide input, and may also include one or more of a speaker for providing audio output and a video display device for providing textual, audiovisual and/or graphical output. Computing system environment 600 may also include optical scanners (not shown).

Spatial computing identity verification computing device 601 may operate in a networked environment supporting connections to one or more other computing devices, such as computing device 641 and 651. Computing devices 641 and 651 may be personal computing devices or servers that include any or all of the elements described above relative to spatial computing identity verification computing device 601.

The network connections depicted in FIG. 6 may include Local Area Network (LAN) 625 and Wide Area Network (WAN) 629, as well as other networks. When used in a LAN networking environment, spatial computing identity verification computing device 601 may be connected to LAN 625 through a network interface or adapter in communications module 609. When used in a WAN networking environment, spatial computing identity verification computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      receive, via light detection and ranging (LiDAR) functionality of a spatial computing device, first image data of a first user environment viewed by a user through the spatial computing device at a first time, wherein the LiDAR functionality of the spatial computing device captures dimensions of the first user environment and positions of objects within the first user environment;
      extract, from the first image data, metadata including the captured dimensions of the first user environment and positions of objects within the first user environment;
      generate, based on the extracted metadata, a first spatial computing map corresponding to the first user environment viewed by the user through the spatial computing device at the first time, wherein the spatial computing map includes static objects within the first user environment and non-static features within the first user environment;
      score the first spatial computing map of the first user environment at the first time, wherein the score of the first spatial computing map indicates a likelihood that a user of the spatial computing device is a valid user;
      store the first spatial computing map and score;
      receive, via the spatial computing device, a request to process a transaction;
      responsive to receiving the request to process the transaction, transmit, to the spatial computing device, an instruction causing the spatial computing device to capture, via the LiDAR functionality, second image data of a current environment viewed by the user through the spatial computing device at a current time, wherein the LiDAR functionality of the spatial computing device captures dimensions of the current environment and positions of objects within the current environment;
      extract, from the second image data, metadata including the captured dimensions of the current environment and positions of objects within the current environment;
      generate, based on the extracted metadata from the second image data, a second spatial computing map corresponding to the current environment viewed by the user through the spatial computing device at the current time;
      analyze, by executing a machine learning model, the second spatial computing map to detect any anomalies between the second image data and the first image data;
      score, based on the analysis, the second spatial computing map, wherein the score of the second spatial computing map indicates a likelihood that the user of the spatial computing device is the valid user;
      compare the score of the second spatial computing map to a threshold;
      responsive to determining, based on the comparing, that the score of the second spatial computing map meets or exceeds a threshold, validate the user of the spatial computing device and authorize processing of requested transaction; and responsive to determining, based on the comparing that the score of the second spatial computing map is below the threshold, initiate one or more validation failure actions.

2. The computing platform of claim 1, wherein the current environment viewed by the user through the spatial computing device is a same environment as the first user environment viewed by the user through the spatial computing device.

3. The computing platform of claim 1, wherein the one or more validation failure actions include one or more of: activating multi-factor authentication or requesting authentication data from the user of the spatial computing device.

4. The computing platform of claim 1, wherein initiating the one or more validation failure actions includes initiating a fraud notification.

5. The computing platform of claim 1, wherein initiating the one or more validation failure actions includes rejecting the request to process the transaction.

6. The computing platform of claim 1, wherein the first image data includes virtual objects overlaying the first user environment on a display of the spatial computing device.

7. The computing platform of claim 1, wherein the machine learning model is trained using historical data including the first spatial computing map.

8. The computing platform of claim 1, further including instructions that, when executed, cause the computing platform to:
generate spatial computing maps representing additional environments viewed by the user through the spatial computing device; and
store the generated spatial computing maps representing the additional environments viewed by the user through the spatial computing device.

9. A method, comprising:
receiving, by a computing platform, the computing platform having at least one processor and memory, and via light detection and ranging (LiDAR) functionality of a spatial computing device, first image data of a first user environment viewed by a user through the spatial computing device at a first time, wherein the LiDAR functionality of the spatial computing device captures dimensions of the first user environment and positions of objects within the first user environment;
extracting, by the at least one processor and from the first image data, metadata including the captured dimensions of the first user environment and positions of objects within the first user environment;
generating, by the at least one processor and based on the extracted metadata, a first spatial computing map corresponding to the first user environment viewed by the user through the spatial computing device at the first time, wherein the spatial computing map includes static objects within the first user environment and non-static features within the first user environment;
scoring, by the at least one processor, the first spatial computing map of the first user environment at the first time, wherein the score of the first spatial computing map indicates a likelihood that a user of the spatial computing device is a valid user;
storing the first spatial computing map and score;
receiving, by the at least one processor and via the spatial computing device, a request to process a transaction;
responsive to receiving the request to process the transaction, transmitting, by the at least one processor and to the spatial computing device, an instruction causing the spatial computing device to capture, via the LiDAR functionality, second image data of a current environment viewed by the user through the spatial computing device at a current time, wherein the LiDAR functionality of the spatial computing device captures dimensions of the current environment and positions of objects within the current environment;
extracting, by the at least one processor and from the second image data, metadata including the captured dimensions of the current environment and positions of objects within the current environment;
generating, by the at least one processor and based on the extracted metadata from the second image data, a second spatial computing map corresponding to the current environment viewed by the user through the spatial computing device at the current time;
analyzing, by the at least one processor and by executing a machine learning model, the second spatial computing map to detect any anomalies between the second image data and the first image data;
scoring, by the at least one processor and based on the analysis, the second spatial computing map, wherein the score of the second spatial computing map indicates a likelihood that the user of the spatial computing device is the valid user;
comparing, by the at least one processor, the score of the second spatial computing map to a threshold;
based on determining, based on the comparing, that the score of the second spatial computing map meets or exceeds a threshold, validating, by the at least one processor, the user of the spatial computing device and authorize processing of requested transaction; and
based on determining, based on the comparing that the score of the second spatial computing map is below the threshold, initiating, by the at least one processor, one or more validation failure actions.

10. The method of claim 9, wherein the current environment viewed by the user through the spatial computing device is a same environment as the first user environment viewed by the user through the spatial computing device.

11. The method of claim 9, wherein the one or more validation failure actions include one or more of: activating multi-factor authentication or requesting authentication data from the user of the spatial computing device.

12. The method of claim 9, wherein initiating the one or more validation failure actions includes initiating a fraud notification.

13. The method of claim 9, wherein initiating the one or more validation failure actions includes rejecting the request to process the transaction.

14. The method of claim 9, wherein the first image data includes virtual objects overlaying the first user environment on a display of the spatial computing device.

15. The method of claim 9, wherein the machine learning model is trained using historical data including the first spatial computing map.

16. The method of claim 9, further including:
generating, by the at least one processor, spatial computing maps representing additional environments viewed by the user with the spatial computing device; and
storing the generated spatial computing maps representing the additional environments viewed by the user through the spatial computing device.

17. One or more non-transitory computer-readable media storing instructions that, when executed by a computing platform comprising at least one processor, memory, and a communication interface, cause the computing platform to:

receive, via light detection and ranging (LiDAR) functionality of a spatial computing device, first image data of a first user environment viewed by a user through the spatial computing device at a first time, wherein the LiDAR functionality of the spatial computing device captures dimensions of the first user environment and positions of objects within the first user environment;

extract, from the first image data, metadata including the captured dimensions of the first user environment and positions of objects within the first user environment;

generate, based on the extracted metadata, a first spatial computing map of corresponding to the first user environment viewed by the user through the spatial computing device at the first time, wherein the spatial computing map includes static objects within the first user environment and non-static features within the first user environment;

score the first spatial computing map of the first user environment at the first time, wherein the score of the first spatial computing map indicates a likelihood that a user of the spatial computing device is a valid user;

store the first spatial computing map and score;

receive, via the spatial computing device, a request to process a transaction;

responsive to receiving the request to process the transaction, transmit, to the spatial computing device, an instruction causing the spatial computing device to capture, via the LiDAR functionality, second image data of a current environment viewed by the user through the spatial computing device at a current time, wherein the LiDAR functionality of the spatial computing device captures dimensions of the current environment and positions of objects within the current environment;

extract, from the second image data, metadata including the captured dimensions of the current environment and positions of objects within the current environment;

generate, based on the extracted metadata from the second image data, a second spatial computing map corresponding to the current environment viewed by the user through the spatial computing device at the current time;

analyze, by executing a machine learning model, the second spatial computing map to detect any anomalies between the second image data and the first image data;

score, based on the analysis, the second spatial computing map, wherein the score of the second spatial computing map indicates a likelihood that the user of the spatial computing device is the valid user;

compare the score of the second spatial computing map to a threshold;

responsive to determining, based on the comparing, that the score of the second spatial computing map meets or exceeds a threshold, validate the user of the spatial computing device and authorize processing of requested transaction; and responsive to determining, based on the comparing that the score of the second spatial computing map is below the threshold, initiate one or more validation failure actions.

18. The one or more non-transitory computer-readable media of claim 17, wherein the first image data includes virtual objects overlaying the first user environment on a display of the spatial computing device.

* * * * *